United States Patent

Yamanis

[11] Patent Number: 5,549,983
[45] Date of Patent: Aug. 27, 1996

[54] COFLOW PLANAR FUEL CELL STACK CONSTRUCTION FOR SOLID ELECTROLYTES

[75] Inventor: Jean Yamanis, Morristown, N.J.

[73] Assignee: AlliedSignal Inc., Morris Township, N.J.

[21] Appl. No.: 589,226

[22] Filed: Jan. 22, 1996

[51] Int. Cl.$^6$ ........................................ H01M 8/10
[52] U.S. Cl. ........................ 429/32; 429/34; 429/38; 429/218
[58] Field of Search ........................ 429/32, 34, 38, 429/39, 218

[56] References Cited

U.S. PATENT DOCUMENTS

| | | | |
|---|---|---|---|
| 4,770,955 | 9/1988 | Ruhl | 429/33 |
| 5,399,442 | 3/1995 | Shundo | 429/32 |
| 5,480,738 | 1/1996 | Elangovan et al. | 429/32 |
| 5,486,428 | 1/1996 | Gardner et al. | 429/34 X |

Primary Examiner—Anthony Skapars
Attorney, Agent, or Firm—Ernest D. Buff

[57] ABSTRACT

A fuel cell stack is based on solid electrolytes, such as the oxygen-ion conducting solid oxide fuel cells and the proton conducting ceramic or polymer membrane fuel cells. The fuel cell has a radial, coflow planar stack with an integral, internal manifold and tubular porous elements for controlling the rate and uniformity of the radial fuel and oxidant fluid flows. Such construction minimizes the extent of sealing that may be required and provides for easy manifolding of stack arrays. In addition, the fuel cell construction has the potential for high mass and volume specific power densities and low fabrication costs.

33 Claims, 5 Drawing Sheets

COFLOW PLANAR FUEL CELL STACK CONSTRUCTION FOR SOLID ELECTROLYTES

BACKGROUND OF THE INVENTION

1. Field of the Invention

This invention relates to the construction of fuel cell stacks, and more particularly to the construction of fuel cells, such as oxygen-ion conducting solid oxide fuel cells and proton conducting ceramic or polymer membrane fuel cells, in which the electrolyte is a solid.

2. Description of the Prior Art

Fuel cells with solid electrolytes are the most promising technologies for power generation. Solid electrolytes are either ion-conducting ceramic or polymer membranes. Ceramic oxygen-ion conducting membranes are primarily based on zirconia but other electrolytes for lower operating temperatures are under development. The most advanced construction with ceramic membranes is the tubular solid oxide fuel cell based on zirconia. The tubular construction can be assembled into large units without seals and this is its biggest engineering advantage. Tubular solid oxide fuel cells are fabricated by electrochemical vapor deposition processes, which are slow and costly. The tubular geometry of these fuel cells limits the specific power density, both on weight and volume basis, to low values while the electron conduction paths are long and lead to high energy losses due to internal resistance heating. For these reasons, other constructions are actively being pursued at the present time.

The most common alternative construction to the tubular construction is the planar construction which resembles a cross-flow heat exchanger. The planar cross flow fuel cell is built from alternating flat single cell membranes, which are trilayer anode/electrolyte/cathode structures, and bipolar plates, which conduct current from cell to cell and provide channels for gas flow, into a cubic structure, or stack, which is manifolded externally on four faces for fuel and oxidant gas management. At the very minimum, the single cell membrane and the bipolar plate of every cell in the stack must be sealed together gas-tight at each manifold face and the manifolds must be sealed gas-tight to the stack to prevent fuel and oxidant gas cross leakage. Fuel and oxidant gas cross leakage compromises fuel cell efficiency and is hazardous due to the mixture's potential for explosion. Sealant materials with thermal expansion coefficient matching those of the other components of the stack and with satisfactory lifetime at the operating temperatures of about 1000° C. are not available at the present time, and this represents a serious technological shortcoming for planar solid oxide fuel cells. Planar fuel cell stacks may, at least in theory be constructed in a coflow configuration, but no realistic construction exists for external manifolding because of the extremely short dimensions of the gas channels required for high power densities.

U.S. Pat. No. 4,490,445 teaches a solid oxide fuel cell construction in which the single cells and the conductor, or interconnector, plates have a circular footprint. In this construction the conductor plates have groove networks on both major faces which are formed by mostly circular ridges. The grooves define gas passages for the flow of gases. For example, fuel gas is introduced at the periphery of the conductor plate into the space defined by the conductor groove network and the anode side of the single cell, flows into the groove network through a line of notches in the ridges, then to an exit opening, located at the diametrically opposite end of the plate, and from there the partially reacted fuel gas stream is channeled to the next conductor/anode gas space. The overall flow pattern of the fuel gas throught the groove network is mixed radial/circumferential pattern but is mostly circumferential. The ridges of the conductor plates contact the single cell electrode faces for current conduction. Each of the conductor major faces is coated with a coating having the same composition as the electrode being in contact with. Moreover, these conductor plates have circumferential ridges arranged along the edges of said conductor plate to define gas seals. In this construction, there are fuel and oxidant streams in and out of the stack, these streams are in counterflow, and, on the fuel side, each successive cell is contacted by progressively more reacted fuel stream. In summary, U.S. Pat. No. 4,490,445 refers to a very specific SOFC construction, i.e., a construction with conductor plates having groove networks formed by ridges to define gas passages wherein these conductor plates have circumferential ridges arranged along the edges of the conductor plate to define gas seals and the primary surfaces of these conductors have surface coatings of the same composition as the electrodes they are in contact with.

U.S. Pat. No. 4,629,537 is a sequel to U.S. Pat. No. 4,490,445 and teaches fabrication of the solid oxide electrolyte plate by plasma spraying, the plate thickness ranging from about 50 to 750 micrometers, and assembling fuel cell stacks by stacking alternating layers of electrolyte and interconnector plates, as defined in U.S. Pat. No. 4,490,445, together.

U.S. Pat. No. 4,770,955 teaches a solid oxide fuel cell construction with gas-impervious electrolyte and separator plates and powder (or partially-sintered), i.e., porous, anode and cathode layers which make contact with the electrolyte and the separator plates, and gas-impervious tubular gaskets for gas sealing. In this construction the anode and cathode layers act as the electrodes and the cell-to-cell interconnects at the same time. The gas-impervious tubular gaskets, when properly bonded to the electrolyte and separator plates around openings corresponding to the internal diameter of the tubular gaskets, define axial conduits for fuel and oxidant gas distribution to the anode and cathode layers, respectively. Moreover, this construction requires semi-impervious sealing at the periphery of he anode layer. One of the inherent weaknesses of this construction is the lack of good flow control. Gas flow is controlled by the electrode layers, i.e., by the porosity of the powder or partially-sintered electrode layers and the length of these layers in the direction of flow. The unsymmetrical location of gas inlet conduits, gives rise to differing flow path lengths and, thereby, non-uniform flow distribution over the cathode and anode electrodes.

U.S. Pat. No. 5,399,442 teaches a solid oxide fuel cell construction with metallic interconnector plates, dense ceramic disks separating the interconnector plates, and an annular single cell trilayers. The interconnector plates, have a manifold part and a reaction part which is made up of guide vanes on either flat surface of the plate. These guide vanes create a sequence of dams, so to speak, which are notched to allow for the passage of the reaction gases from one dam to the next and ultimately out at the interconnector circumference. A dense ceramic disk provides electrical insulation between the metallic interconnectors. The ceramic disks and the single cells are sealed to the interconnector by seal materials which are mixtures of glass and ceramic which liquefy at the fuel cell operating temperature of about 1000° C. The metallic interconnectors are provided with two drilled holes to allow passage of the inlet gases from feed channels over the single cell electrodes.

Proton ion-conducting membranes or proton electrolyte membranes (PEM) are primarily based on Nafion® but other materials are under development for slightly higher operating temperatures. Fuel cells based on PEM are put together in a planar configuration very much like the planar construction described above for the solid oxide fuel cells. Due to the much lower operating temperature, i.e., about 80° C., of PEM fuel cells sealing is not a major problem, but the technology would benefit from a construction that is easy to assemble and manifold.

SUMMARY OF THE INVENTION

The present invention provides a novel construction for fuel cells with solid electrolytes. This construction minimizes the sealing and manifolding problems of the cross-flow, planar construction and, at the same time, provides for coflow of fuel and oxidant gases.

Generally stated, the fuel cell construction of the present invention comprises:

1) an internal, longitudinal manifold, said manifold having at least two separate, longitudinal, interior cavities, and a corresponding number of sets of side openings, each said set communicating with only one of said interior cavities; 2) a plurality of annular single cells, each of said cells comprising an annular solid electrolyte plate sandwiched between an annular anode plate and an annular cathode plate wherein the inner cylindrical surface of each said cell is bonded to the exterior surface of said manifold; 3) a plurality of annular separator plates wherein the inner cylindrical cylindrical surface of said plate is bonded to the exterior surface of said manifold at a distance of at least 0.1 mm away from the proximate annular single cell; 4) a plurality of tubular porous elements, wherein each of the elements is bonded to one flat surface of the single cell and the proximate flat surface of the adjacent separator plate, thereby creating an annular void space between the said porous element and the said manifold wherein each said annular void space communicates with one of the interior cavities of said mainifold through the side openings of said manifold; and 5) a plurality of current conductor elements, said elements having a skeletal structure and being distributed in the space defined by each single cell and the adjacent separator plate, said space being exterior to said annular porous elements.

The internal manifold may be made of a material selected from the group consisting of ceramics, glass-ceramics, metallic alloys, metal-ceramic composites, and intermetallics. When the manifold material of construction includes electrically conducting materials the manifold should incorporate an electrically insulating layer on its exterior surface. In a preferred embodiment the internal manifold is made of an oxidation resistant metallic alloy which upon oxidation develops an electrically insulating, oxidation-protective coating.

The single cells comprise a dense solid electrolyte plate, which may conduct oxygen ions or protons, sandwiched between anode and cathode electrode plates, layers or coatings. Either electrode may be bonded to the electrolyte or be in contact with the electrolyte.

The separator plates may be made of a material selected from the group consisting of metallic alloys, intermetallics, metal-ceramic composites, ceramics, and glass-ceramics.

The outer periphery of the annular separator and single cell plates may be circular or polygonal.

The porous cylindrical elements may be made of a material selected from the group consisting of metallic alloys, intermetallics, metal-ceramic composites, ceramics and glass-ceramics.

The current conductor elements may made of an electronic conductor material selected from the group consisting of metallic alloys, intermetallics, metal-ceramic composites, ceramics, and glass-ceramics. These elements may also be made out of carbon-based materials. These elements may be singular, preassembled annular parts or segmented. They may be made of metallic materials in one or more forms selected from the group consisting of felt forms, foam forms, woven fabrics, machined products and corrugated products. The current conductor elements may be bonded to or contacting the single cells or the separator plates or both.

The bonding materials for bonding the single cell and the separator plates to the manifold and the porous cylindrical elements to the single cell and the separator plates may be of a material selected from the group consisting of metallic alloys, glass, and glass-ceramics.

BRIEF DESCRIPTION OF THE DRAWINGS

The invention will be more fully understood and further advantages will become apparent when reference is had to the following detailed description and the accompanying drawings, in which.

DESCRIPTION OF THE PREFERRED EMBODIMENTS

The present invention provides an construction for fuel cells with solid electrolytes wherein the solid electrolyte comprises ceramic or polymer-based materials. This construction minimizes the sealing and manifolding problems of the cross-flow, planar construction while, at the same time, provideing for coflow of fuel and oxidant gases.

Figure 1:
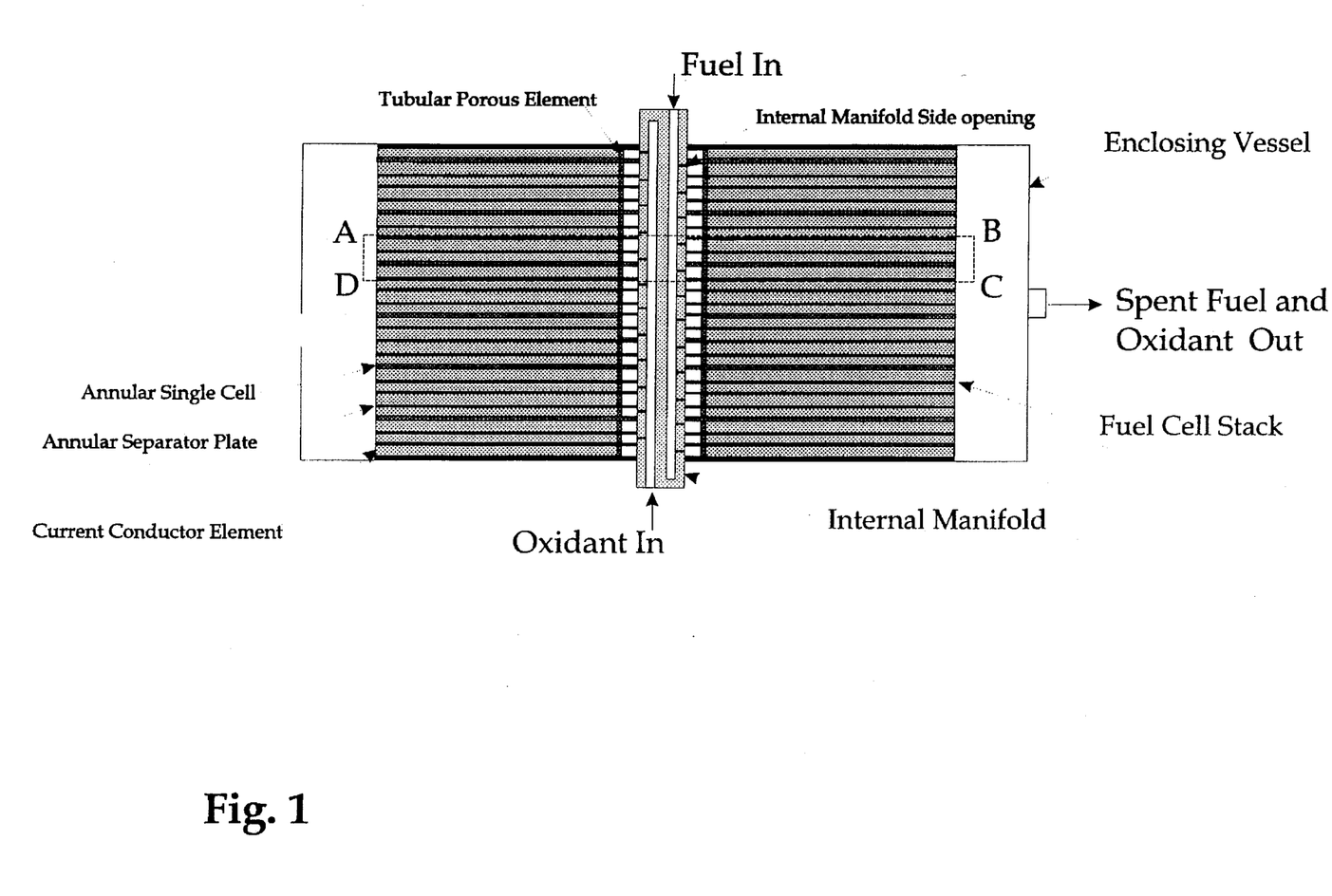
FIG. 1 depicts schematically a cross-section of the internally manifolded fuel cell stack construction of the present invention and the stack enclosing vessel.
Figure 2:
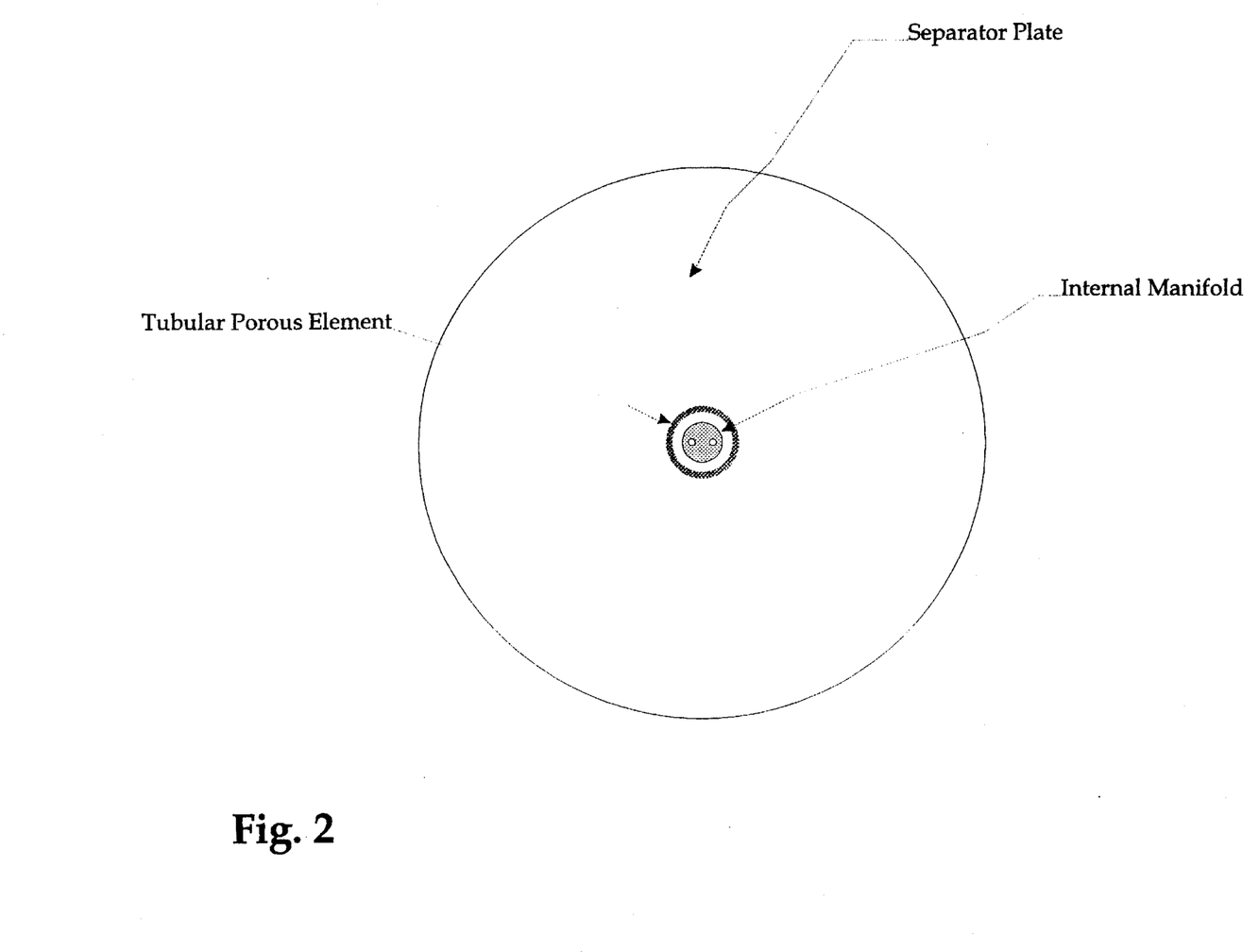
FIG. 2 depicts schematically a top view of the internally manifolded fuel cell stack construction of the present invention showing essential features at the separator plate level.

A longitudinal cross-section of the fuel cell construction of the present invention is schematically shown in FIG. 1. This construction comprises 1) an internal, longitudinal manifold, 2) annular single cells, 3) annular separator plates, 4) tubular porous elements, and 5) current conductor elements. For simplicity, the annular single cells and the separator plates are considered to be flat and circular, as shown in FIG. 2, which is a top-view of the fuel cell stack of FIG. 1 depicting essential features at the separator plate level. It will readily be appreciated by those skilled in the art that other, higher surface area geometrical shapes could be accommodated. The fuel cell construction of the present invention operates with a fuel inflow stream, an oxidant inflow stream and a spent fuel and oxidant outflow stream, as shown in FIG. 1.

Figure 3:
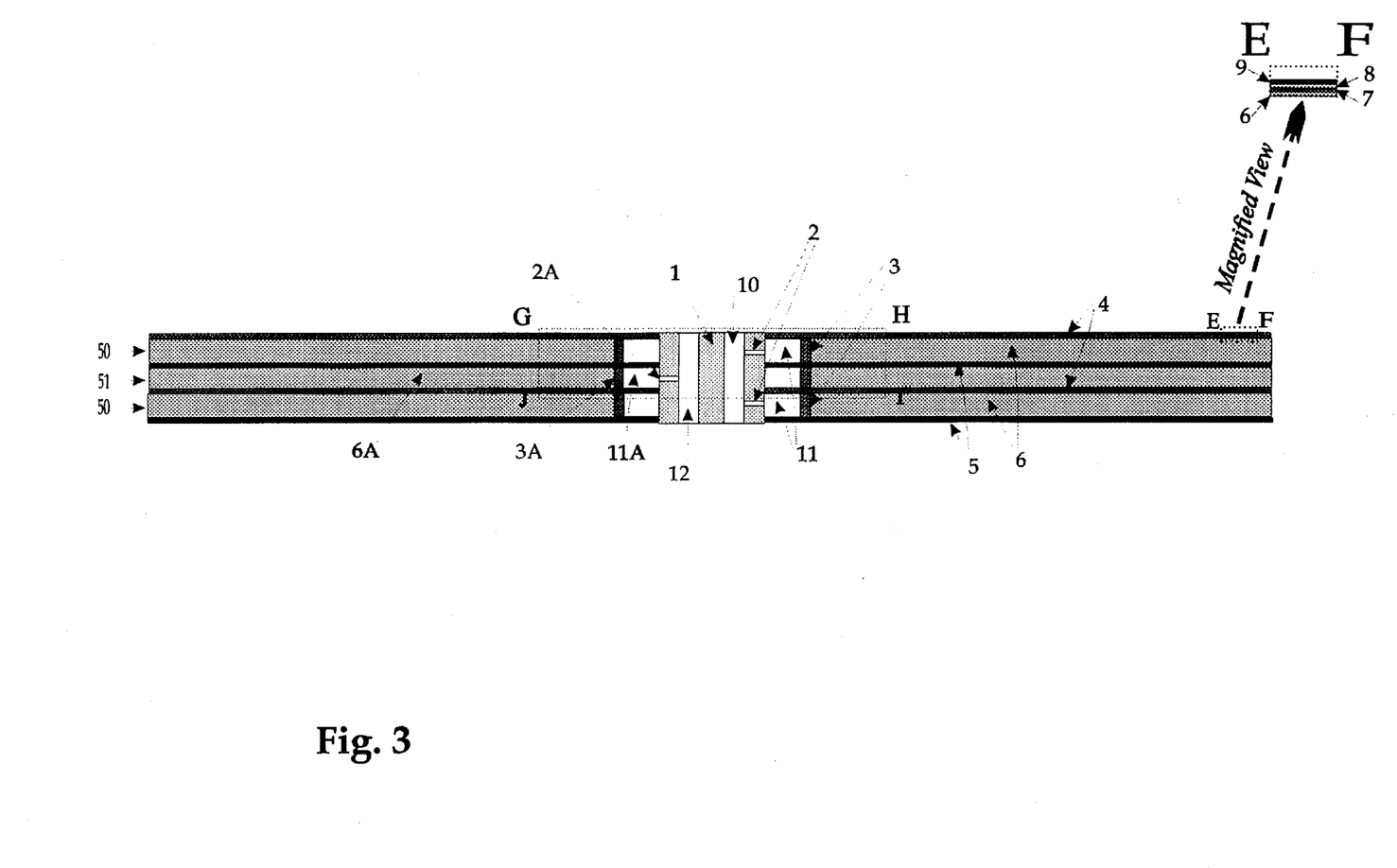
FIG. 3 is a magnified view of the cross-sectional area ABCD shown in FIG. 1.

The internal manifold, which preferably has a cylindrical overall shape, has at least two separate, longitudinal, interior cavities and a number of sets of side openings, the number of sets corresponding to the number of cavities of the internal manifold, wherein each set of side openings communicates with only one of the interior cavities of the manifold. The drawings of FIGS. 1 and 3 show a manifold with two internal cavities and two sets of side openings.

The annular single cells comprise an annular solid electrolyte plate sandwiched between an annular anode plate and an annular cathode plate wherein the inner cylindrical surface of each said cell is preferably bonded to the exterior surface of the internal manifold. The inner cylindrical surface of each annular separator plate is also preferably bonded to the exterior surface of the internal manifold at a distance of at least 0.1 mm away from an adjacent annular single cell. The top and bottom flat surfaces of each tubular porous element are also preferably bonded to one flat surface of a single cell and the proximate flat surface of the adjacent separator plate thereby creating an annular void space between the porous element and the exterior surface of the manifold. This annular void space communicates with one of the interior cavities of the manifold through a side opening of the manifold. The current conductor elements are preferably uniformly distributed in the space defined by each single cell and the adjacent separator plate, said space being exterior to the annular porous element. The current conductor elements have a skeletal structure by construction so as to allow a predominantly radial and uniform flow over the fuel cell electrode surfaces. The current conductor elements may also be referred to as interconnect elements.

For simplicity, the drawings of the present application do not show any details for the current collection wiring at the top and bottom ends of the fuel cell stack. In addition, for the sake of brevity, the internal manifold is shown in the drawings as having only two longitudinal cavities, one for fuel and one for oxidant gas. However, the manifold could easily be constructioned to have a third longitudinal cavity for bringing into the stack a third fluid stream as a stack coolant. Also for the sake of brevity, the stack is considered to be based on the following repeat unit: [-cell-current conductor (fuel side)-separator-current conductor (oxidant side)-] but the stack could also easily be constructioned to have an extra layer in the repeat unit for cooling purposes, i.e., [-cell-current conductor (fuel side)-separator-current conductor (oxidant side)-separator-current conductor (coolant side)-] as needed, for example, in PEM fuel cells.

For the sake of clarity, further elaboration will be made with reference to solid oxide fuel cells as an example. Solid oxide fuel cells do not require separate coolant fluids or coolant layers. FIG. 3 shows a magnified view of the cross-sectional area ABCD of FIG. 1. FIG. 3 clearly shows cross-sections of the manifold, 1, with its interior cavities, 10 and 12; the internal manifold side openings, 2 and 2A; the tubular porous elements, 3 and 3A; the annular void spaces, 11 and 11A; two annular single cell plates, 4, each single cell being a trilayer of anode, 7, electrolyte, 8, and cathode, 9, as shown in the magnified view of the area of detail EF; two separator plates, 5; and three current conductor elements, 6 and 6A, which are shown as single annular elements occupying the space between an annular single cell and an annular separator plate exterior to the tubular porous elements. The top and bottom annular void spaces, 11, communicate with the manifold interior cavity 10 through the internal manifold side openings 2, while the middle annular void space, 11A, communicates with the manifold interior cavity 12 through side opening 2A. The manifold interior cavities, 10 and 12, the manifold side openings, 2 and 2A, and the tubular porous elements, 3 and 3A, need to be constructioned so as to accommodate the required fluid flow rates for proper operation of the fuel cell stack.

Under fuel cell operating conditions, fuel from manifold interior cavity, 10, flows into the annular void space, 11, through the internal manifold side opening, 2, and is distributed throughout this annular void space at essentially constant pressure by having the tubular porous element, 3, constructioned so as to provide a flow resistance. Fuel from the annular void space 11 is distributed uniformly over 360° by the tubular porous element 3 into space occupied by the current conductor element 6 and flows in a predominantly radial direction outwards while reacting over the anode electrode of the annular single cell plate, 4, to almost complete conversion by the end of its travel, 50. In the adjacent current conductor space, oxidant from the manifold interior cavity, 12, flows into the annular void space, 11A, via side opening 2A, and is distributed uniformly over 360° by the tubular porous element 3A into the space occupied by the current conductor element 6A, flows in a predominantly radial direction outwards over the cathode electrode while supplying oxygen ions to the anode electrode via the electrolyte, and exits the fuel cell stack at 51. The fuel and oxidant gases are kept separate as they flow radially over the electrodes of the annular single cell by separator plate 5, and the converted fuel stream and partly reacted oxidant stream mix at the ends of their travel, 50 and 51, respectively.

The flow of the fuel is controlled, by means of its pressure in the annular void space and the resistance of the tubular porous element, so that the fuel is mostly reacted by the time it leaves the stack, 50. Near complete conversion of the fuel permits mixing of the reaction product/residual fuel stream with the oxidant stream at the outer periphery of the fuel cell stack as is shown in FIGS. 1 and 3. This type of fuel flow control enables simplification of the stack construction and is inherent in the construction of the present invention. As FIG. 1 shows, this construction requires only three gas streams, instead of the required four streams in a conventional planar stack construction. The three gas streams are: a fuel inflow stream, an oxidant inflow stream and a spent oxidant and fuel outflow stream. Moreover, the fewer number of gas streams of this construction simplify manifolding problems, requiting tightly fitted or sealed manifolding only for the inflow fluid streams. The enclosing vessel, FIG. 1, for the collection of the fuel cell stack outflow streams can, in essence, be considered as a sealless manifold.

Figure 4:
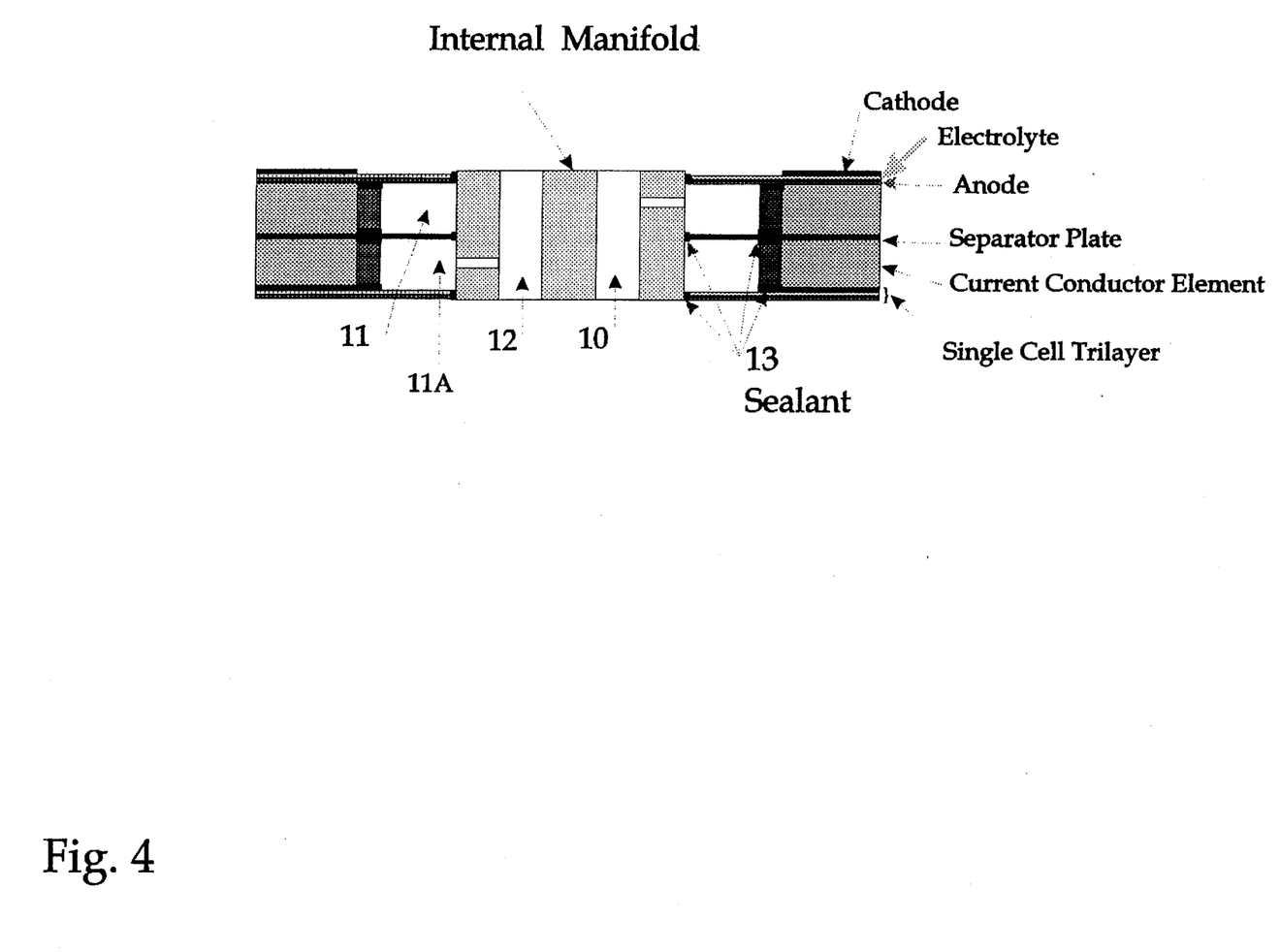
FIG. 4 is a magnified view of the cross-sectional area GHIJ shown in FIG. 3.

In a preferred embodiment of the present invention, the annular separator plate and the annular single cell plate should be bonded to the exterior surface of the internal manifold and the tubular porous elements should be bonded onto the flat surfaces of the annular separator plate and the annular single cell plate, as shown in FIG. 4, in order to minimize gas leakage and to ensure uniform fluid flow over the fuel cell electrodes. However, this is not a requirement as long as gas leakage around the boundaries of the annular void space is minimized by fitting parts tightly together through the application of compressive forces or by any other suitable means. The bonding of the annular separator and single cell plates to the manifold and of the tubular porous elements to the flat surfaces of the separator and single cell plates may also be referred to as sealing, and the bonding materials used for the purpose of bonding may be referred to as sealants. FIG. 4 is an enlarged view of the area GHIJ in FIG. 3 and shows details of sealing at the intersection boundaries of the the annular void spaces 11 and 11A. In a preferred embodiment of the present invention, bonding materials or sealants, 13, are used to bond the associated parts together to eliminate fluid cross-leakage and maldistribution.

FIG. 4 also shows details of the annular single cell plate construction. In particular, FIG. 4 shows that the cathode electrode is preferably limited to the single cell area which is exterior to the tubular porous element. The main reason for this is to bond the tubular porous element to the strong, pore-free electrolyte substrate rather than to bond it to the very porous and relatively weak cathode layer. Another reason, for this is the absence of current conductor elements within the annular void space for carrying the generated current through.

The set of annular separator plate, the current conductor elements on either side of the annular separator plate and the two porous cylindrical elements used between successive annular single cells could be used as separate pieces during stack assembly, or they could be bonded into a single unit, herein called the interconnect assembly, prior to assembling the stack. The use of a prebonded interconnect assembly would have the advantage of minimizing the potential for gas leakage along the boundaries of the individual parts, since each interconnect assembly could be subjected to quality control prior to assembling the stack.

Whether tight fitting or bonding is used in assembling the stack, measures should be taken to ensure that the internal manifold does not short the stack. If the internal manifold material is electrically conducting, an electrically insulating layer should be formed or applied on its exterior surface prior to stack assembly.

Figure 5:
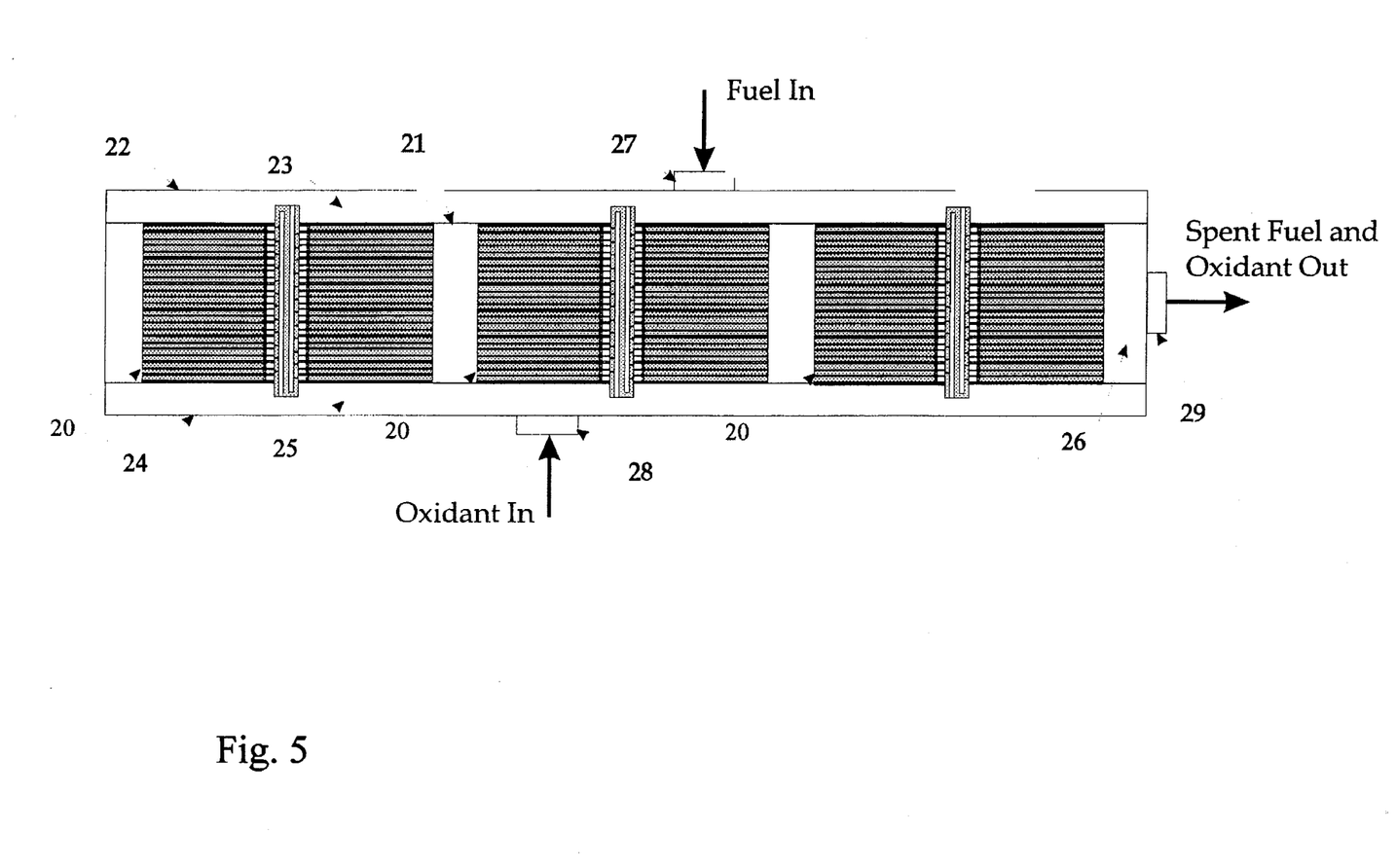
FIG. 5 is a schematic cross-section of an array of three internally manifolded fuel cell stacks of the present invention in an enclosing vessel and associated fuel and oxidant compartments.

FIG. 1 shows one fuel cell stack in an enclosing vessel. FIG. 5 shows a manifolded array of three stacks. The array of stacks, 20, is assembled in a single enclosing vessel, 21. A fuel manifold enclosure, 22, is used to create a fuel supply compartment, 23, for the distribution of fuel to the individual stacks. An oxidant manifold enclosure, 24, is used to create an oxidant compartment, 25, for the distribution of oxidant to the individual stacks. Fuel is supplied to the fuel supply compartment via inflow port 27, oxidant is supplied to the oxidant supply compartment via inflow port 28, while the spent fuel and oxidant streams from the individual stacks combine in the stack compartment 26 for exhaust via ouflow port 29. As in the case of the single stack shown in FIG. 1, the stack array may be operated with one inflow fuel stream, one oxidant inflow stream and one spent fuel and oxidant stream.

The simple manifolding shown in FIG. 5 for a three stack array could be applied to PEM fuel cells as well if the coolant fluid can be mixed with the spent oxidant and fuel stream. In that case, an additional top or bottom coolant manifold enclosure would be provided to create a coolant compartment for the distribution of coolant to the individual stacks via a third interior cavity in the internal manifold which would extend into the coolant compartment.

The internal manifold may be made of a material selected from the set comprising ceramics, glass-ceramics, metallic alloys, oxidation resistant metallic alloys, metal-ceramic composites, and intermetallics. When the material of construction includes electrically conducting materials the manifold should incorporate an electrically insulating layer on its exterior surface. In a preferred embodiment of the present invention, the manifold is made of oxidation resistant alloy which upon oxidation develops an electrically insulating, adherent and oxidation-protective coating.

The single cells comprise a dense solid electrolyte plate, which may conduct oxygen ions or protons, sandwiched between the required anode and cathode electrode plates, layers or coatings. Either electrode may be bonded to the electrolyte or be in contact with the electrolyte.

The separator plate may be made of an electronic conductor material selected from the group consisting of metallic alloys, intermetallics, metal-ceramic composites, ceramics, and glass-ceramics. The separator plates may have a simple annular geometry or more complex geometry. For example, the interior cylindrical surface of the plate may be extruded so as to form a lip that may provide better sealing to the internal manifold.

The outer periphery of the separator and single cell plates may be circular or polygonal.

The porous cylindrical elements may be made of a material selected from the group consisting of metallic alloys, intermetallics, metal-ceramic composites, ceramics, and glass-ceramics.

The current conductor elements may be made of an electronic conductor material selected from the group consisting of metallic alloys, intermetallics, metal-ceramic composites, ceramics, and glass-ceramics. These elements may also be made out of carbon-based materials if the fuel cell operating temperatures are low enough that carbon oxidation processes are not detrimental. These elements may be singular, preassembled annular parts or segmented. These elements have a skeletal structure so as to allow unimpeded flow of fuel and oxidant fluids over the fuel cell electrode surfaces. They may be made of metallic materials in one or more forms selected from the set comprising felt forms, foam forms, woven fabrics, machined products, and corrugated products. In all cases, they should be constructioned and positioned so that they are distributed uniformly in all directions in the space between each single cell and adjacent separator plates. The current conductor elements may be bonded to or adequately contacting the single cell or the separator plate or both.

The bonding materials for bonding the single cell and the separator plates to the manifold and the porous cylindrical elements to the single cell and the separator plates may be of a material selected from the group consisting of metallic alloys, glass, and glass-ceramics.

In summary, the outstanding features of the radial, coflow planar stack construction of the present invention are the integral, internal manifold and tubular porous elements for controlling the rate and uniformity of the radial fuel and oxidant fluid flows. These features and the overall construction minimize the extent of sealing that may be required and provide for easy manifolding of stack arrays. In addition, the construction of the present invention has the potential for high mass and volume specific power densities and low fabrication costs.

Having thus described the invention in rather full detail, it will be understood that such detail need not be strictly adhered to but that further changes and modifications may suggest themselves to one skilled in the art, all falling within the scope of the invention as defined by the subjoined claims.

What it is claimed is:

1. A fuel cell stack, comprising:
   a. an internal, longitudinal manifold, said manifold having at least two separate, longitudinal, interior cavities, and a corresponding number of sets of side openings, each of said sets communicating with a single one of said interior cavities;
   b. a plurality of single cells, each of said cells comprising an annular solid electrolyte plate sandwiched between an annular solid anode plate and an annular solid cathode plate, wherein the inner cylindrical surface of each of said cells is bonded to the exterior surface of said manifold;

c. a plurality of annular separator plates, wherein the inner cylindrical surface of each of said plates is bonded to the exterior surface of said manifold at a distance of at least 0.1 mm away from said single cells;

d. a plurality of tubular porous elements, wherein each of said elements is bonded to one flat surface of one of said single cells and the proximate flat surface of the next of said single cells-in-the-sequence separator plate, thereby creating an annular void space between said porous element and said manifold wherein each said annular void space communicates with one of the interior cavities of said mainifold through a side opening of said manifold; and e. a plurality of current conductor elements, said elements having a skeletal structure and being distributed in the space defined by each single cell and the adjacent separator plate, said space being exterior to said tubular porous elements.

2. A fuel cell stack, comprising:

a. an internal, longitudinal manifold, said manifold having at least two separate, longitudinal, interior cavities, and a corresponding number of sets of side openings, each said set communicating with only one of said interior cavities;

b. a plurality of single cells, each of said single cells comprising an annular solid electrolyte plate sandwiched between an annular solid anode plate and an annular solid cathode plate wherein the inner cylindrical surface of each of said cells is tightly fitted to the exterior surface of said manifold;

c. a plurality of annular separator plates, the inner cylindrical surface of each of said plates is tightly fitted to the exterior surface of said manifold at a distance of at least 0.1 mm away from said single cells;

d. a plurality of tubular porous elements, each of said elements being in close contact with one flat surface of one of said single cells and the proximate flat surface of the next-in-the-sequence separator plate thereby creating an annular void space between the said porous element and the said manifold wherein each said annular void space communicates with one of the interior cavities of said manifold through a side opening of said manifold; and e. a plurality of current conductor elements, each of said conductor elements having a skeletal structure and being distributed in the space defined by each single cell and the adjacent separator plate, said space being exterior to said tubular porous elements.

3. An array of fuel cell stacks, comprising as recited by claim 1, said array of fuel cell stacks being enclosed in an enclosing vessel so that the fuel supply end of the internal manifold of each of the individual stacks extends into a fuel supply compartment adjoining said enclosing vessel while the oxidant end of the internal manifold of each of the individual stacks extends into an oxidant supply compartment also adjoining said enclosing vessel, said enclosing vessel having one or more outflow ports for the exhaust of spent fuel and oxidant fluid, said fuel supply compartment having one or more fuel inflow ports for the supply of fuel to the stack array, and said oxidant supply compartment having one or more inflow ports for the supply of oxidant to the stack array.

4. An array of fuel cell stacks as recited by claim 2, said array of fuel cell stacks being enclosed in an enclosing vessel so that the fuel supply end of the internal manifold of said individual stacks extends into a fuel supply compartment adjoining said enclosing vessel while the oxidant end of the internal manifold of said individual stacks extends into an oxidant supply compartment also adjoining said enclosing vessel, said enclosing vessel having one or more outflow ports for the exhaust of spent fuel and oxidant fluid, said fuel supply compartment having one or more fuel inflow ports for the supply of fuel to the stack array, and said oxidant supply compartment having one or more inflow ports for the supply of oxidant to the stack array.

5. A fuel cell stack as recited by claim 1, wherein said internal manifold is composed of a material selected from the group consisting of ceramics, glass-ceramics, metallic alloys, metal-ceramic composites, and intermetallics.

6. A fuel cell stack as recited by claim 1, wherein the internal manifold is composed of a material selected from the group consisting of metallic alloys, metal-ceramic composites, and intermetallics and the exterior surface of the internal manifold is coated with an electrically insulating layer.

7. A fuel cell stack as recited by claim 1, wherein the internal manifold is preferably composed of an oxidation resistant metallic alloy which upon oxidation develops an electrically insulating, oxide coating.

8. A fuel cell stack as recited by claim 1, wherein said annular single cells comprises a dense solid electrolyte plate, said electrolyte being an oxygen-ion conductor sandwiched between anode and cathode electrode plates, layers or coatings.

9. A fuel cell stack as recited in claim 1, wherein said annular single cells comprise a dense solid electrolyte plate, said electrolyte being a proton conductor sandwiched between anode and cathode electrode plates, layers or coatings.

10. A fuel cell stack as recited by claim 1, wherein the separator plates are composed of an electronic conductor material selected from the group consisting of metallic alloys, intermetallics, metal-ceramic composites, ceramics, and glass-ceramics.

11. A fuel cell stack as recited by claim 1, wherein the outer periphery of the annular separator and single cell plates is circular.

12. A fuel cell stack as recited by claim 1, wherein the porous cylindrical elements are composed of material selected from the group consisting of metallic alloys, intermetallics, metal-ceramic composites, ceramics, and glass-ceramics.

13. A fuel cell stack as recited by claim 1, wherein the current conductor elements are composed of an electronic conductor material selected from the group consisting of metallic alloys, intermetallics, metal-ceramic composites, ceramics, and glass-ceramics.

14. A fuel cell stack as recited by claim 1, wherein the current conductor elements are composed of carbon-based materials.

15. A fuel cell stack as recited by claim 1, wherein the current conductor elements are singular, preassembled annular parts.

16. A fuel cell stack as recited by claim 1, wherein the current conductor elements are composed of metallic materials in one or more forms selected from the group consisting of felt forms, foam forms, woven fabrics, machined products, and corrugated products.

17. A fuel cell stack as recited by claim 1, wherein the, current conductor elements are bonded to the single cells and the separator plates.

18. A fuel cell stack as recited by claim 1, wherein the current conductor elements are only in contact with the single cells and the separator plates.

19. A fuel cell stack as recited by claim 1, wherein the bonding materials for bonding the single cell and the separator plates to the manifold and the porous cylindrical elements to the single cell and the separator plates are selected from the group consisting of metallic, glass, and glass-ceramic materials.

20. A fuel cell stack as recited by claim 2, wherein the internal manifold is composed of a material selected from the group consisting: of ceramics, glass-ceramics, metallic alloys, metal-ceramic composites, and intermetallics.

21. A fuel cell stack as recited by claim 2, wherein the internal manifold is composed of a material selected from the group consisting of metallic alloys, metal-ceramic composites, and intermetallics and the exterior surface of the internal manifold is coated with an electrically insulating layer.

22. A fuel cell stack as recited by claim 2, wherein the internal manifold is composed of an oxidation resistant metallic alloy which upon oxidation develops an electrically insulating, oxidation-protective coating.

23. A fuel cell stack as recited by claim 2, wherein the annular single cells comprise a dense solid electrolyte plate, said electrolyte being an oxygen-ion conductor sandwiched between anode and cathode electrode plates, layers or coatings.

24. A fuel cell stack as recited by claim 2, wherein the annular single cells comprise a dense solid electrolyte plate said electrolyte being a proton conductor sandwiched between anode and cathode electrode plates, layers or coatings.

25. A fuel cell stack as recited by claim 2, wherein the separator plates are composed of an electronic conductor material selected from the group consisting of metallic alloys, intermetallics, metal-ceramic composites, ceramics, and glass-ceramics.

26. A fuel cell stack as recited by claim 2, wherein the outer periphery of the annular separator and single cell plates is polygonal.

27. A fuel cell stack as recited by claim 2, wherein the porous cylindrical elements are composed of material selected from the group consisting of metallic alloys, intermetallics, metal-ceramic composites, ceramics, and glass-ceramics.

28. A fuel cell stack as recited by claim 2, wherein the current conductor elements are composed of an electronic conductor material selected from the group consisting of metallic alloys, intermetallics, metal-ceramic composites, ceramics, and glass-ceramics.

29. A fuel cell stack as recited by claim 2, wherein the current conductor elements are composed of carbon-based materials.

30. A fuel cell stack as recited by claim 2, wherein the current conductor elements are segmented.

31. A fuel cell stack as recited by claim 2, wherein the current conductor elements are composed of metallic materials in one or more forms selected from the group consisting of felt forms, foam forms, woven fabrics, machined products, and corrugated products.

32. A fuel cell stack as recited by claim 2, wherein the current conductor elements are bonded to the single cells and the separator plates.

33. A fuel cell stack as recited by claim 2, wherein the current conductor elements are only in contact with the single cells and the separator plates.

* * * * *